Patented Nov. 24, 1942

2,302,825

UNITED STATES PATENT OFFICE 2,302,825

FORTIFICATION AND DECARBONIZING OF SULPHURIC ACID

Cecil B. Wilde, Long Beach, and Earl T. Ross, Huntington Park, Calif., assignors to Stauffer Chemical Company, a corporation of California No Drawing. Application April 29, 1941, Serial No. 390,950

5 Claims. (Cl. 23—172)

This invention relates to the recovery and fortification of sulphuric acid which has become diluted and contaminated in use. More particularly the invention is concerned with provision of a relatively simple process capable of being practiced continuously on acid employed in the esterification of olefins such as ethylene, propylene, butylene and the like. While the subject is fully treated by Ellis, "Chemistry of Petroleum Derivatives," Chemical Catalog Co., 1934, particularly in volume I, chapter 14, it may be briefly stated that gaseous mixtures of olefins, ordinarily produced by an oil refinery cracking operation, are treated with sulphuric acid to form olefin sulphates, sometimes termed esters. These, upon hydrolysis, react to give various alcohols and sulphuric acid. However, the sulphation-esterification reaction, even of a single olefin such as propylene, is complicated by polymerization and decomposition of the polymers formed. Accordingly, the acid finally removed from the process is diluted, ordinarily to 70%–80% strength and is contaminated with carbon, various organic materials, and smells strongly of petroleum. Further, it is of a black color and its iron sulphate content is ordinarily quite high.

It is in general the board object of the present invention to provide a simple continuous process for the decarbonization and fortification of waste sulphuric acid resulting from the manufacture of alcohols and solvent petroleum products.

A further object of the present invention is to provide an acid recovery process enabling 98% water white commercial strength substantially carbon free sulphuric acid to be produced continuously and in a relatively simple manner.

The invention includes other objects and features of advantage, some of which, together with the foregoing, will appear hereinafter, wherein the present preferred manner of practicing the process of this invention is set forth. By way of example and not by way of limitation the treatment of one waste acid in accordance with the present invention will be outlined.

The waste acid contained approximately 78%–80% sulphuric acid and 0.5% total carbon present in the form of various hydrocarbons and organic compounds. This carbon content varies, usually it is less than 3%. The acid was jet black in color, opaque and had a strong odor of petroleum. It contained considerably more iron than usual commercial acids of equal strength. Fifty-three tons gross of this black 80% acid containing 42.5 tons of sulphuric acid and 10.5 tons of water were treated with 48 tons of sulphur trioxide gas. It is a feature of the present invention that the waste acid is fed directly into the absorption system of a contact sulphuric acid plant. We have found that even though the acid is contaminated with carbon, ill smelling and containing various unknown hydrocarbons, it can be successfully employed in the absorption system in a contact acid plant as a source of water for the sulphur trioxide gas-water reaction. Surprisingly, the carbon content of the weak feed acid does not reduce the sulphur trioxide absorption rate or the degree of absorption to any appreciable extent. As the 80% black acid is fed into the absorption system, its bulk is increased by the absorption of sulphur trioxide gas. A continuous stream of acid is, therefore, withdrawn to keep the volume constant.

The addition of the 48 tons of sulphur trioxide gas brought the gross weight up to 101 tons made up of 99 tons of acid and 2 tons of water. This increase in weight results in the carbon content, on a weight basis, being reduced proportionately, in the instance under discussion almost 50%.

After the acid had been brought up to strength by the absorption of sulphur trioxide gas, it was heated to a temperature in the range of 600°–620° F. In accordance with this invention it has been determined that sulphuric acid of constant boiling point strength, approximately 98.3%, is an oxidizing agent and actively converts the carbon in organic compounds, whether free or combined, into carbon monoxide or carbon dioxide or both.

In actual practice we have found that the concentrated alcohol plant waste acid is usually only very slowly oxidized at temperatures below 600° F. and that at 610° F. or 615° F. the oxidation or decarbonization becomes quite active. With a concentrated waste acid of 98% strength to start with, treatment for different periods of time at a temperature of 610° F. shows the following degree of decarbonization:

| Time | Acid color | Carbon | Decarbonized |
|---|---|---|---|
| | | Per cent | Per cent |
| Start | Jet black | .082 | |
| 25 min | Dark red | .021 | 74.40 |
| 40 min | Red | .0135 | 83.57 |
| 60 min | Orange | .008 | 90.23 |
| 80 min | Yellow | .006 | 92.68 |
| 100 min | Light yellow | .004 | 95.12 |
| 120 min | Pale yellow tint | .002 | 97.56 |
| 140 min | White | .000 | 100.00 |

With an acid of greater carbon content to start with, the oxidation takes place proportionately much more rapidly. It will be observed that during the first twenty-five minutes of treatment nearly three-quarters of the carbon was removed; if there had been more carbon present, this high rate of oxidation would have been maintained until the carbon content fell to around .02%.

In practice it has been found that ordinary concentrated (98%) alcohol-plant waste acid can be completely decolorized, and the carbon content lowered to a few thousandths of one per cent, by holding the acid at a temperature of 610° F. for two hours. If it is not necessary to remove the last trace of carbon, the treatment may be limited to an hour, after which the acid will be light orange in color and translucent.

Due to the fact that acids of lower strength boil at temperatures below 600° F. there is little or no oxidation possible at lower temperatures and ordinary pressures. In order to reach the active temperature of 600° F. the acid must not boil below that point, and must, therefore, be very close to 98% in strength; if the acid is weaker, water is boiled off until the strength is 98%, and if the acid is stronger, sulphur trioxide is boiled off until the same strength is attained. In heating any acid with a sufficiently hot heating medium, for a sufficiently extended period of time, the acid will automatically reach the optimum strength and temperature for decarbonization.

It is possible to heat weaker acid, under pressure, to attain the desired and necessary temperature, and thus have decarbonization, but mechanical difficulties make this of problematical value commercially.

The loss of sulphuric acid during decarbonization depends upon the carbon content. In general, experience indicates that the acid loss amounts to around ten to twelve times the weight of carbon oxidized, provided the vapors from the acid are condensed and added to the final product. The main loss is the sulphur dioxide gas formed during oxidation.

We claim:

1. A process for decarbonizing and fortifying a 70%–80% sulphuric acid contaminated with between about 0.5% and about 3% of carbon and carbon containing organic compounds resulting from olefin sulphation by said acid, said process comprising first adding sulphur trioxide to said acid to fortify the acid and increase the acid content thereof to substantially 98% and then maintaining the fortified acid at a temperature of about 610° F. for about two hours to oxidize the carbon and carbon containing compounds.

2. A process for decarbonizing and fortifying a 70%–80% sulphuric acid contaminated with between about 0.5% and about 3% of carbon and carbon containing organic compounds resulting from olefin sulphation by said acid, said process comprising first bringing said acid into contact with sulphur trioxide gas from a contact sulphuric acid plant to fortify said acid by adding sulphur trioxide to said acid to increase the acid content thereof to substantially 98% and then maintaining the fortified acid at a temperature of about 610° F. for about two hours to oxidize the carbon and carbon containing compounds.

3. A process for decarbonizing and fortifying a 70%–80% sulphuric acid contaminated with between about 0.5% and about 3% of carbon and carbon containing organic compounds resulting from olefin treatment with said acid, said process comprising first adding sulphur trioxide to said acid to fortify the acid and increase the acid content thereof to substantially 98% and then maintaining the fortified acid at a temperature in the range of 600°–620° F. for about sixty minutes to oxidize the carbon and carbon containing compounds.

4. A process for decarbonizing and fortifying a 70%–80% sulphuric acid contaminated with between about 0.5% and about 3% of carbon and carbon containing organic compounds resulting from olefin treatment with said acid, said process comprising first adding sulphur trioxide to said acid to fortify the acid and increase the acid content thereof to substantially 98% and then maintaining the fortified acid at a temperature of about 610° F. for about two hours to oxidize the carbon and carbon containing compounds.

5. The process comprising first fortifying a 70%–80% sulphuric acid with sulphur trioxide to increase its strength to substantially 98% and thereafter maintaining said fortified acid at a temperature of about 610° F. to oxidize free and combined carbon present in said acid in an amount between about 0.5% and 3%.

CECIL B. WILDE.
EARL T. ROSS.